US010683628B2

(12) United States Patent
Serna García-Conde et al.

(10) Patent No.: US 10,683,628 B2
(45) Date of Patent: Jun. 16, 2020

(54) SYSTEM FOR INSTALLING ANTI-SCOURING MATERIAL IN A SELF-FLOATING MARINE FOUNDATION, AND ASSOCIATED METHODS AND USES OF SAID SYSTEM

(71) Applicant: ESTEYCO SAP, Madrid (ES)

(72) Inventors: José Salustiano Serna García-Conde, Madrid (ES); Miguel Ángel Fernández Gómez, Madrid (ES)

(73) Assignee: ESTEYCO S.A., Madrid (ES)

( * ) Notice: Subject to any disclaimer, the term of this patent is extended or adjusted under 35 U.S.C. 154(b) by 0 days.

(21) Appl. No.: 16/322,346

(22) PCT Filed: Jul. 28, 2017

(86) PCT No.: PCT/ES2017/070550
§ 371 (c)(1),
(2) Date: Jan. 31, 2019

(87) PCT Pub. No.: WO2018/024930
PCT Pub. Date: Feb. 8, 2018

(65) Prior Publication Data
US 2019/0177942 A1 Jun. 13, 2019

(30) Foreign Application Priority Data
Aug. 2, 2016 (ES) .................................. 201631068

(51) Int. Cl.
*E02B 17/02* (2006.01)
*E02D 27/52* (2006.01)
(Continued)

(52) U.S. Cl.
CPC .......... *E02B 17/0017* (2013.01); *E02B 17/00* (2013.01); *E02B 17/02* (2013.01);
(Continued)

(58) Field of Classification Search
CPC ......... E02D 27/42; F03D 13/25; E02B 17/00; E02B 17/0017; E02B 2017/0039; E02B 2017/0091
(Continued)

(56) References Cited

U.S. PATENT DOCUMENTS

| 4,571,121 A * | 2/1986 | Albert ..................... E02B 17/02 405/15 |
| 2011/0158753 A1* | 6/2011 | Ohkubo .................. E02D 15/10 405/302.6 |

(Continued)

FOREIGN PATENT DOCUMENTS

| DE | 102012212609 | * | 5/2013 |
| JP | 401014412 | * | 1/1989 |

(Continued)

OTHER PUBLICATIONS

International Search Report and Written Opinion received in PCT Application No. PCT/ES2017/070550, dated Sep. 28, 2017.

*Primary Examiner* — Frederick L Lagman
(74) *Attorney, Agent, or Firm* — Knobbe, Martens, Olson & Bear, LLP

(57) ABSTRACT

The present disclosure relates to a system for installing anti-scouring material on a premanufactured marine foundation, said foundation being transportable in a self-floating manner to its final position on the seabed; comprising: at least one device for housing the anti-scouring material; at least one device for securing the anti-scouring material and/or said housing device to the marine foundation; and wherein the housing device and the securing device are installable on the marine foundation prior to the marine foundation being installed in its final position.

11 Claims, 6 Drawing Sheets

(51) Int. Cl.
  *E02B 17/00* (2006.01)
  *F03D 13/25* (2016.01)
  *E02D 27/42* (2006.01)
  *E02D 31/00* (2006.01)

(52) U.S. Cl.
  CPC .......... *E02D 27/42* (2013.01); *E02D 27/425* (2013.01); *E02D 27/52* (2013.01); *E02D 31/00* (2013.01); *F03D 13/25* (2016.05); *E02B 2017/0039* (2013.01); *E02B 2017/0091* (2013.01); *Y02E 10/727* (2013.01)

(58) Field of Classification Search
  USPC ...................................... 405/211, 224, 224.1
  See application file for complete search history.

(56) References Cited

U.S. PATENT DOCUMENTS

| | | | |
|---|---|---|---|
| 2012/0128436 A1* | 5/2012 | Harris ..................... | E02D 27/42 405/302.6 |
| 2016/0002872 A1* | 1/2016 | Gallagher ........... | E02B 17/0017 405/17 |
| 2016/0265180 A1* | 9/2016 | Lanca Coelho ........ | E02B 17/02 |

FOREIGN PATENT DOCUMENTS

| | | | | |
|---|---|---|---|---|
| WO | WO-2011092038 A1 * | 8/2011 | ............ | E02D 27/42 |
| WO | WO 2014/125127 A1 | 8/2014 | | |
| WO | WO 2014/131660 A1 | 9/2014 | | |
| WO | WO 2014/180828 A1 | 11/2014 | | |
| WO | WO 2015/070282 A1 | 5/2015 | | |

\* cited by examiner

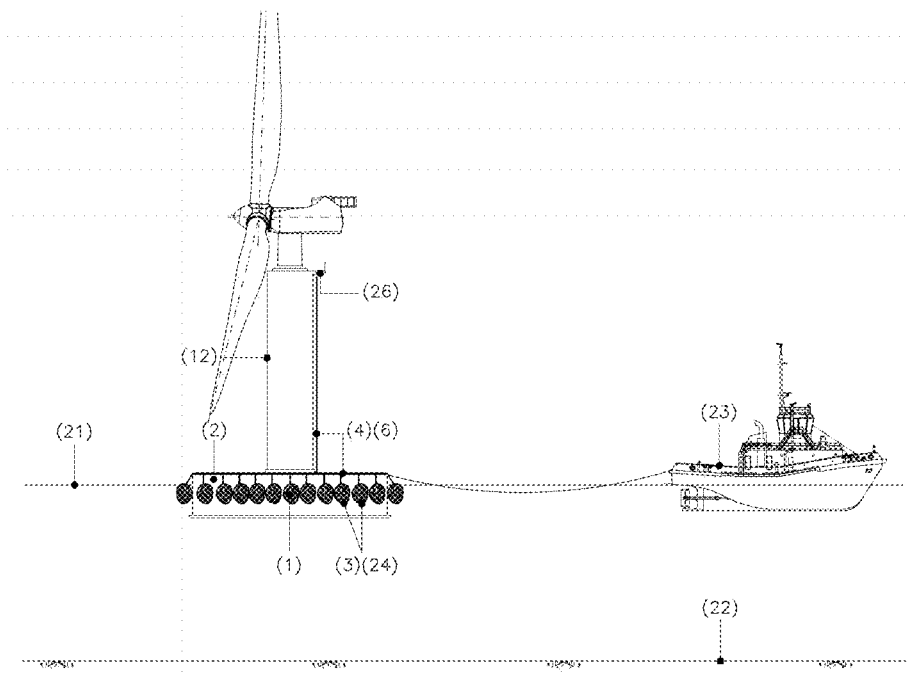
FIG. 11A
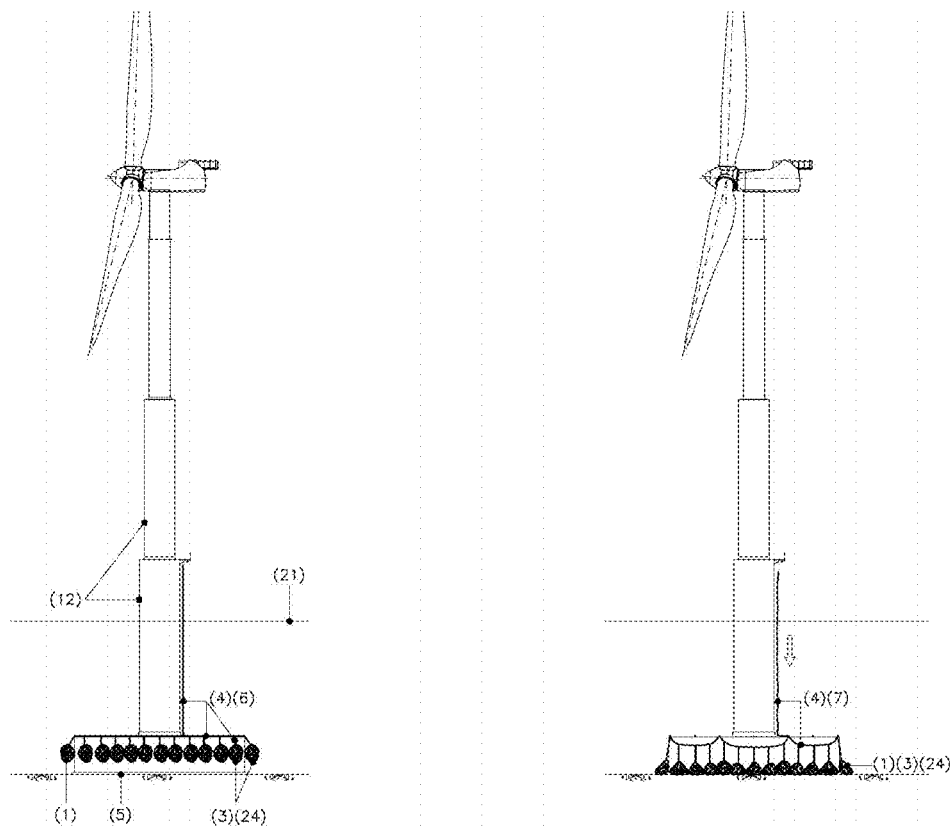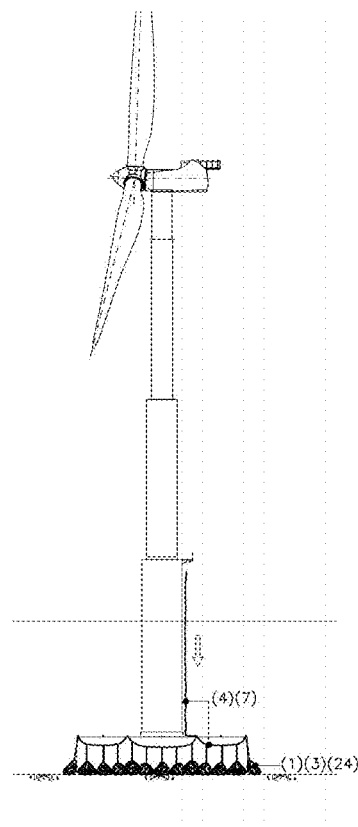
FIG. 11B　　　　　　　　FIG. 11C

SYSTEM FOR INSTALLING ANTI-SCOURING MATERIAL IN A SELF-FLOATING MARINE FOUNDATION, AND ASSOCIATED METHODS AND USES OF SAID SYSTEM

This application is the U.S. National Phase under 35 U.S.C. § 371 of International Application No. PCT/ES2017/070550, filed Jul. 28, 2017, designating the U.S., and published in Spanish as WO 2017/024930 A1 on Feb. 8, 2018, which claims priority to Spanish Patent Application No. P201631068, filed Aug. 2, 2016, the entire contents of which are incorporated herein by reference.

FIELD OF THE INVENTION

The present invention belongs to the field of public works construction, especially for marine infrastructures that generate green or renewable energy. More specifically, the invention relates to means for transporting and placing, in the installation site of a premanufactured underwater foundation, material intended to protect the underwater bed whereon said material is placed against scouring caused by the effects of the water around the foundation. Likewise, the invention relates to a system and a method based on said means for transporting and placing anti-scouring material, and the preferred uses thereof.

The invention is especially applicable to premanufactured foundations that are installed on the seabed, given that the seabed is an underwater bed prone to scouring due to the constant and often strong movement of the waters thereof. In particular, the present invention is applicable to premanufactured foundations of concrete, using gravity and transported in a self-floating manner, to support the wind turbine towers of an offshore wind farm.

BACKGROUND OF THE INVENTION

The methods for constructing aquatic structures make use, normally, of premanufactured foundations. Said foundations are manufactured, at least for the most part, far from the installation site of the foundation, being transported to said site in a floating manner, either in a self-floating manner or with assistance from separate flotation means (barges, tugs, floats, etc.), and being installed by means of sinking in the underwater bed.

One type of premanufactured foundation, compatible with the present invention, is the gravity foundation, wherein the foundation comprises a solid or hollow body, optionally weighed down, which is stably installed on the underwater bed by the effects of, at least mainly, the very weight thereof and/or the weight of the ballast thereof, if appropriate.

Scouring is the removal of materials from an underwater bed due to the erosive effects of the water flow around an element arranged in such an underwater bed.

Aquatic infrastructures, and especially marine infrastructures, are, during the useful life thereof, simultaneously subjected to the effects of currents, waves and tides. The result of the interaction between the water flow and the foundation of the infrastructures creates the scouring phenomenon. The appearance of this phenomenon around a foundation can cause the scouring thereof, which represents a very significant problem for the stability of the structure on top.

In order to prevent or at least reduce the scouring around a foundation, the technique of laying anti-scouring material on the area susceptible to undergoing such a phenomenon is known. The anti-scouring material tends to be, for example, gravel or rockfill that is transported in barges and, once the foundation is installed, is placed around the foundation by means of cranes, for example ladle cranes, or by means of pouring machines. Placing anti-scouring material in an installation site of a foundation prior to the installation of the foundation is also known. In any case, it is a technique used with the construction methods that make use of premanufactured foundations.

SUMMARY OF THE INVENTION

The present invention relates, in a first aspect, to a transportation and placement system for anti-scouring material for a premanufactured underwater foundation, wherein said system comprises means adapted to transport said material to the installation site of a premanufactured underwater foundation, and to place in the area contiguous to said foundation, once installed, material intended to protect the underwater bed whereon said material is placed against the scouring caused by the effects of the water around said foundation.

More specifically, the invention relates to a system for installing anti-scouring material on a premanufactured marine foundation, said foundation being transportable in a self-floating manner to its final position on the seabed; wherein said system comprises:
  at least one device for housing the anti-scouring material;
  at least one device for securing the anti-scouring material and/or said housing device to the marine foundation;
  and wherein the housing device and the securing device are installable on the marine foundation prior to the marine foundation being installed in its final position.

In a preferred embodiment of the invention, the device for securing the anti-scouring material and/or the housing device is configurable in, at least, two positions:
  a folded configuration position, wherein it secures the housing device to the marine foundation, such that said anti-scouring material is retracted in said housing device; and
  a deployed configuration position, wherein it releases, completely or partially, the housing device and/or anti-scouring material, promoting the positioning and/or deployment of said material on the seabed in an area contiguous to the marine foundation.

The capacity to configure the device in the described positions provides the following main advantages: on one hand, it is achieved that the first position is more suitable for transportation and for facilitating the installation in the port, while in the second deployed position, the material is meant to be as effective as possible in the mission thereof to prevent scouring. Additionally, in the folded position, it is achieved that the anti-scouring material does not hinder the correct support of the foundation when it touches the bed (preventing it from being underneath when it should not be underneath it but rather on the side).

In another preferred embodiment of the invention, in the folded configuration position of the configurable securing device, the anti-scouring material is retracted or contained in the housing device, and in a position laterally adjacent to the perimeter of the marine foundation and different from the definitive position thereof in the installed condition. And, more preferably, the anti-scouring material comprises one or more materials, being for example: gravel, rocks, sandbags, rockfill, tyres, hardenable compositions, concrete blocks or slabs, hollow concrete bodies, or other ones known in the art.

In another preferred embodiment of the invention, the anti-scouring material that is installed in the marine foundation prior to the marine foundation being installed in its final position, has a density that does not exceed more than 50% of the density of the water and wherein at least a portion of said material is located in a submerged position during the transportation of the marine foundation to its final position. With this it is achieved that the weight of the anti-scouring material that is transported by float together with the self-floating foundation increases in small measure to the depth of the assembly made up of the anti-scouring material and the foundation, which creates significant constructive and logistical advantages, particularly for the operations in port areas with lower depth.

In another preferred embodiment of the invention, said anti-scouring material is fundamentally made up of low-density materials, similar to the density of water, such that if they are transported while submerged when the foundation is transported, they have little to no influence on the depth of the assembly. The anti-scouring material can be based on recycled materials with little to no acquisition cost, such as for example used tyres (tyres meaning the covers of the tyres, with a ring-shaped geometry and concave space along the perimeter thereof).

The anti-scouring material and/or any of the components of the system can incorporate seeds and/or forms of vegetation and/or fertiliser elements intended to facilitate plant growth in the proximity of the foundation, which provides an additional measure to prevent and/or limit the scouring of the terrain.

In another preferred embodiment of the invention, the housing device can comprise one or more of the following elements: a net, a mesh, a geotextile, a grate, a canopy, a cloth or bag for housing or refilling, or any other element of a similar type known in the art which enables provisionally or definitively containing and/or supporting the anti-scouring material. The housing device enables housing and/or supporting the anti-scouring material in provisional situations of the installation process, prior to resting the foundation on the seabed, but it can also carry out the additional function of preventing and/or limiting the dispersion of the anti-scouring material once the support is resting, which could be caused by the action of the waves or the currents.

The housing device can also be configured as one or several protrusions, areas or elements for supporting the anti-scouring material foreseen in the marine foundation and arranged along the perimeter thereof.

In another preferred embodiment of the invention, the system comprises remote control means for the configuration of the positions of the securing device, wherein said remote control means comprise one or more deployment mechanisms by means of mechanical and/or electromechanical transmission, being for example transmission means using tensioners, cables and/or cords. The cited means can be and/or be actuated on an upper platform provided in the head of a lower tower section joined to the foundation, which stays on the surface once the foundation is installed, and which provides a working surface suitable for actuating said control means once the foundation rests on the bed. Said platform can be further used for other functions connected to the installation of the assembly or to the accessibility thereof.

In another preferred embodiment of the invention, the deployment mechanisms which cause the change in the positions of the securing device are automatically activated when a certain situation of the installation process of the foundation is reached, which could be, by way of non-limiting examples, reaching a certain depth, reaching a position resting on the seabed or reaching a certain inner ballast level of the foundation.

In another preferred embodiment of the invention, the marine foundation is a gravity foundation comprising a hollow concrete base. More preferably, the marine foundation is a gravity foundation of a wind turbine tower, with the shape of a hollow concrete disc which could be floating provisionally, and the components of the system for installing anti-scouring material according to the present invention are applied laterally to said foundation, meaning, annexes to the lateral and/or perimeter wall thereof, and not under the foundation. The object of said system is fundamentally intended for anti-scouring protection, and not for the resting conditions of the foundation.

In another embodiment of the invention, the anti-scouring material is shaped by means of essentially flat concrete slabs, the housing device consisting of resting and/or support elements for said slabs provided in the perimeter of the foundation, and the securing device enables, on one hand, a provisional folded configuration to be maintained for said slabs such that they are maintained essentially vertical and/or parallel to the lateral wall of the foundation during the installation process of the foundation, in order to subsequently, after the foundation is resting on the seabed, facilitate a deployed position or configuration for the anti-scouring material wherein the slabs adopt an essentially horizontal position on the seabed.

Optionally, the foundation is equipped with means for fastening, support, penetration or anchoring to the seabed (for example, pillars or skirt-type structures). In another preferred embodiment of the invention, the marine foundation specifically comprises perimeter skirts which penetrate the seabed when the foundation rests thereon, wherein the lower dimension of said skirts is smaller than the dimension of the anti-scouring material, such that the nailing of the skirts is started before the anti-scouring material comes into contact with the seabed. Thanks to the skirts, when the anti-scouring material makes contact with the seabed it prevents the risk of said material being able to slide under the foundation, although it has not yet rested on the bed, since the skirts act as a barrier. Additionally, the skirts make it possible for the tyres to go directly in the definitive dimension thereof (coinciding with the base of the foundation), preventing the need for means of controlling the configuration of the positions of the fastening device. The lower dimension of the skirts is smaller than that of the anti-scouring material both in provisional situations of transportation and/or installation and in the definitive situation or installed condition.

The present invention therefore provides a solution for transporting and placing the anti-scouring material for underwater infrastructures, preventing the use of means or vessels specifically intended to transport and place the anti-scouring material. Furthermore, given that the anti-scouring material can be loaded in the foundation in a space especially adapted for this purpose, for example a port, this task can be performed in a simple and cost-effective manner, and even so the placement of the anti-scouring material in its final position can be foreseen in a precise and reliable manner. Furthermore, given that the placement of the anti-scouring material in its final position is automatically produced when the very foundation is placed, the complexity, times, necessary means and installation costs of the anti-scouring material can all be reduced, especially when dealing with increased depths.

A second aspect of the invention relates to a method for installing anti-scouring material in a premanufactured marine foundation comprising the use of an installation system according to any of the embodiments described in the present document, and comprising the embodiment of, at least, the following steps in any order that is technically possible:

a) arranging anti-scouring material housed and/or supported in at least one housing device;
b) using at least one securing device for installing and/or fastening anti-scouring material and/or at least one device for housing anti-scouring material in the marine foundation, before transferring said marine foundation to its final location on the seabed;
c) transporting in a self-floating manner the marine foundation together with the system for installing anti-scouring material;
d) performing the anchoring of the marine foundation to its final position on the seabed.

In a preferred embodiment of the invention, said securing device and/or said housing device is configurable in at least two positions, being arranged in step b) in a retracted position, and the method comprises, after step d):

e) arranging the securing device in the deployed configuration position, completely or partially releasing the housing device and/or anti-scouring material and promoting the deployment of said material in an area contiguous to the marine foundation.

In a preferred embodiment of the invention, the installation of the system on the seabed is performed in a place far away from the definitive installation site on the seabed, and then the assembly made up of the marine foundation and the system for installing anti-scouring material is transported to said site. More preferably, the marine foundation is transported in a self-floating manner to the immediate area of its definitive installation site, preferably using tugboats or analogous means for the transportation thereof.

In another preferred embodiment of the invention wherein the system comprises remote control means for the configuration of the positions of the securing device, the remote control means operate from a point at or above the surface of the sea, preferably from the head of the lower section of the tower that is partially submerged. Thus, the deployment operation of the anti-scouring material is facilitated.

A third aspect of the invention relates to the use of a system according to any of the embodiments described in this document, during the transportation of a marine foundation in a self-floating manner along the surface of the sea, and/or during the anchoring of a marine foundation to its definitive installation site on the seabed.

A fourth aspect of the invention relates to a wind turbine tower, wind turbine and/or equipment installed on a marine foundation which use a system for installing anti-scouring material according to any of the embodiments described in the present document.

BRIEF DESCRIPTION OF THE DRAWINGS

The characteristics of the invention will be clearer starting from the following detailed description of embodiments thereof, described, by way of example and not limitation, in reference to the attached drawings.

FIGS. 11A-11C show different steps of the method for installing the system described in FIGS. 10A-10B, according to the present invention.

Reference numbers of the drawings:

| | |
|---|---|
| (1) | Anti-scouring material |
| (2) | Marine foundation |
| (3) | Device for housing anti-scouring material |
| (4) | Device for securing the housing device and/or anti-scouring material |
| (5) | Installation site |
| (6) | Folded configuration position of the securing device |
| (7) | Deployed configuration position of the securing device |
| (8) | Concrete box |
| (9) | Upper wall |
| (10) | Lower wall |
| (11) | Side wall |
| (12) | Tower |
| (13) | Tyres |
| (14) | Mesh, geotextile or slab |
| (15) | Grommets |
| (17) | Guide arches |
| (18) | Cord |
| (19) | Long edge of the rectangular mesh |
| (20) | Long edge of the rectangular mesh |
| (21) | Surface of the sea |
| (22) | Seabed |
| (23) | Tugboat |
| (24) | Bags for housing anti-scouring material |
| (25) | Skirts |
| (26) | Working platform |
| (27) | Provisional securing element |

In the figures, identical or analogous elements in different embodiments are indicated using the same reference numbers, adding a prime symbol.

DETAILED DESCRIPTION

Figure 1:
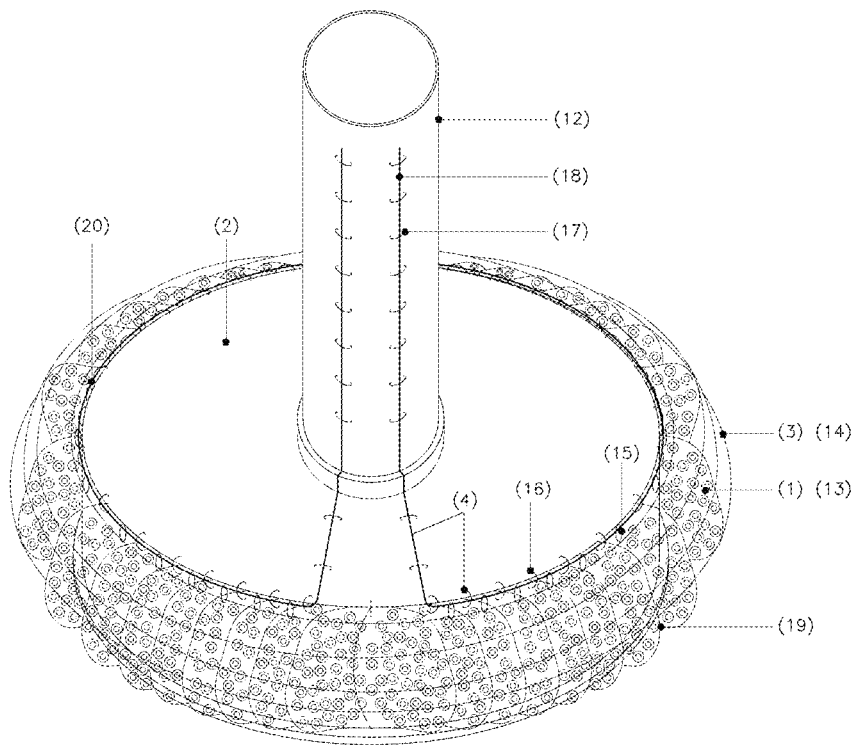
FIG. 1 is a perspective view of the system of the invention, according to a preferred embodiment thereof.
Figure 2:
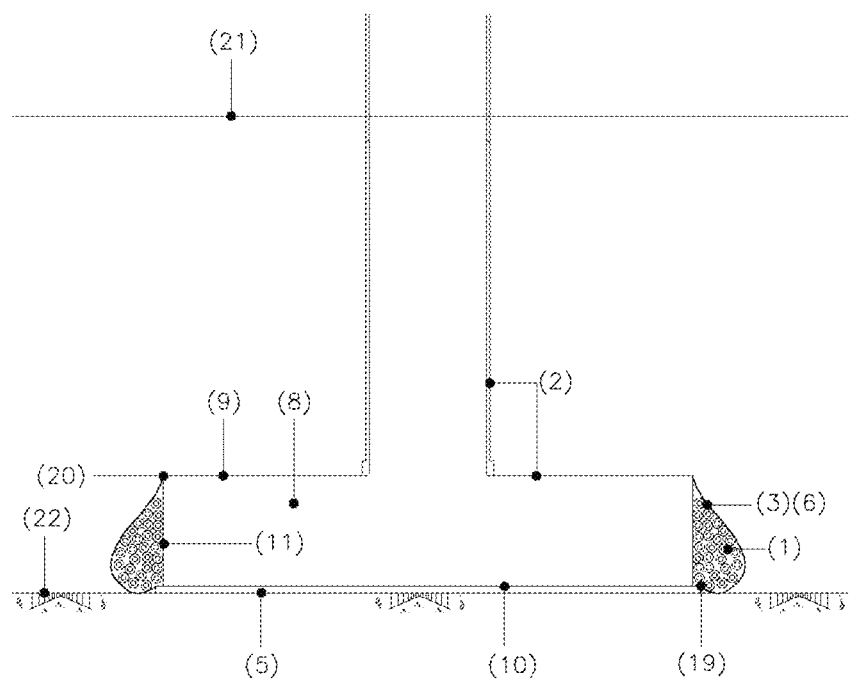
FIG. 2 is a schematic view of the system described in FIG. 1, wherein the folded configuration position is shown, wherein the anti-scouring material is retracted inside said housing device.
Figure 3:
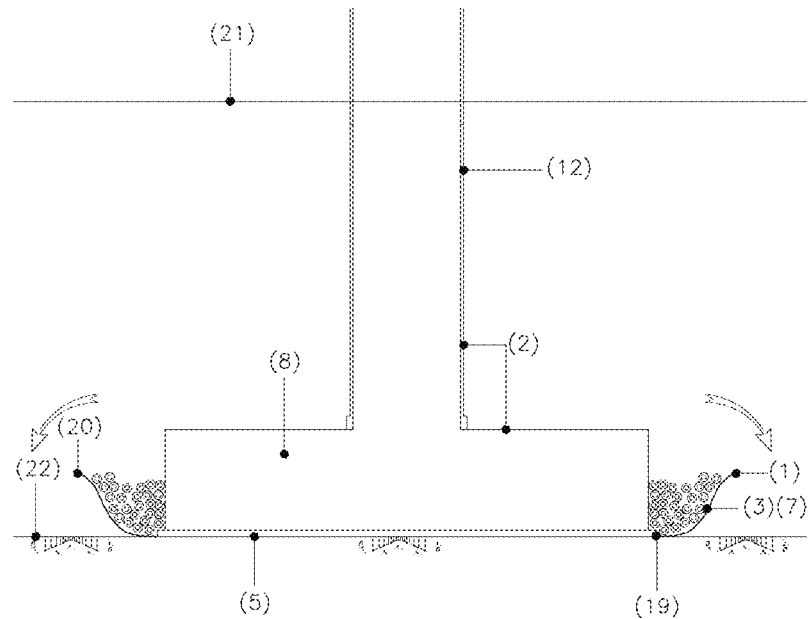
FIG. 3 is a schematic view of the system described in FIG. 1, wherein it shows the change to the deployed configuration position, wherein it releases, completely or partially, the device for housing the anti-scouring material, causing the deployment or positioning of said material in its definitive position contiguous to the marine foundation.

FIGS. 1-3 show an embodiment of the system for installing anti-scouring material (1) in a premanufactured underwater foundation (2) according to the invention.

As seen in said figures, the system for installing anti-scouring material (1) comprises, preferably, at least one device (3) for housing the anti-scouring material (1); and
at least one device (4) for securing the anti-scouring material (1) and/or said housing device (3) to the marine foundation (2);
wherein the housing device (3) and the securing device (4) are installable in the marine foundation (2) prior to the marine foundation (2) being installed in its final position (5).

Preferably, the device (4) for securing the anti-scouring material (1) and/or the housing device (3) is configurable in, at least, two positions:
a folded configuration position (6), wherein it secures the housing device (3) to the marine foundation (2), such that said anti-scouring material (1) is retracted inside said housing device (3); and
a deployed configuration position (7), wherein it releases, completely or partially, the device (3) for housing anti-scouring material (1), promoting the deployment of said material (1) in an area contiguous to the marine foundation (2).

Preferably, the gravity foundation (2) comprises a concrete structure or box (8), having a hollow inner space, and which has an essentially circular and flat upper wall (9), an essentially circular and flat lower wall or slab (10) arranged parallel and concentric to said upper wall (9), and a side wall that in this embodiment is vertical (11) which perimetrically joins said upper wall (9) and said lower wall (10).

Nevertheless, the foundation (2) can have any other shape within the ones used, normally being, for example, frusto-conical, square, etc. The gravity foundation (2) supports a construction comprising, preferably, a tower (12) tall enough to emerge from the surface of the sea at the installation site (5) of the box (8).

In this embodiment, the anti-scouring material (1) comprises a plurality of tyres (13), the housing device (3) comprises a housing mesh (14), and the fastening device (4) comprises an operating assembly made up of grommets (15), attachment arches (16), guiding arches (17) and a cord (18). Nevertheless, and as occurs in the rest of the embodiments of the invention, it is possible to use other equivalent means such as pulleys instead of grommets (15), rings or through holes instead of arches (17), cables instead of cords (18), or any other means known in the art for the guiding and/or securing thereof.

One (19) of the long edges of said mesh (14) is joined in a fixed manner to the radially outer edge of said lower wall (10) and said grommets (15) are distributed uniformly along the other one (20) of the long edges of said mesh (14). The attachment arches (16) are distributed along the upper edge of said vertical wall (11), and said guiding arches (17) are arranged in two parallel rows that extend radially on the upper wall (9), from the radially outer edge of said upper wall (9) to the tower (12), and additionally along the vertical extension of said tower (12) beyond the surface of the sea (21) in the installed condition of the box (8). Said mesh (14) is placed such that said grommets (15) are interspersed between said attachment arches (16). Said cord (18) is threaded in said grommets (15) and said attachment arches (16), therefore crossing through grommets (15) and attachment arches (16) in an alternating manner, and it is additionally threaded in said guiding arches (17) beyond the surface of the sea in the installed condition of the box (8). Said cord (18) has tension so as to be extended in a substantially circumferential manner in the threaded portion thereof in grommets and attachment arches. Said mesh (14) is big enough so as to, in this position, create a pocket with said vertical wall (11) wherein said tyres (13) are housed, perimetrically in relation to said box (8). This situation corresponds to the folded configuration of the securing system, wherein the relative position of the anti-scouring material (1) in relation to the concrete box (8) differs from the one that will be its final position in the installed condition.

The embodiment shown illustrates a securing system with a single cord (18) securing the mesh (14). Naturally, configurations are possible wherein more than one cord (18) or mesh (14) are used generating several operating subsystems without limiting, for this reason, the scope of the invention.

FIGS. 4 to 7 show different phases of the method for using the means for transporting and placing anti-scouring material of FIGS. 1 to 3.

Figure 4:
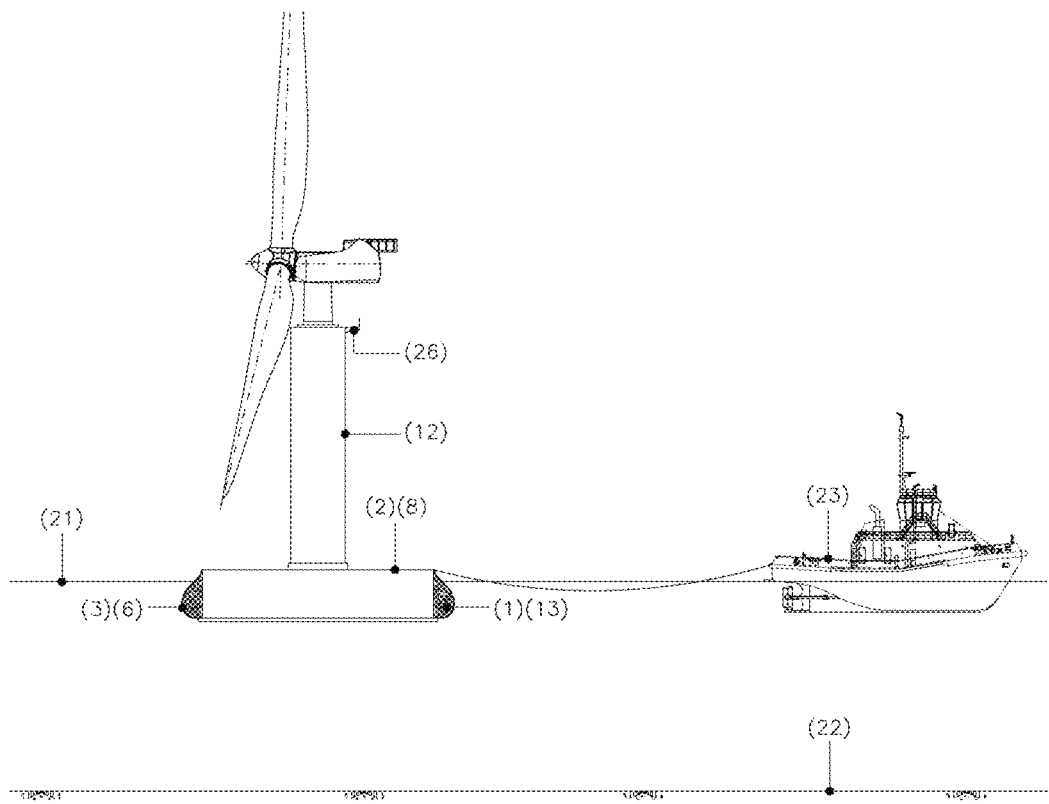
FIGS. 4, 5, 6 and 7 schematically represent, in respective side elevation views, phases of a method for using the embodiment of the transportation and placement means of FIG. 1, according to the present invention.

FIG. 4 shows a mass of water, in this case the sea, which has an underwater bed, in this case the seabed (22), which in turn comprises an installation site (5), (said site being able to be recessed or not). Along the surface of the sea (21), a tugboat (23) moves which tows the box (8) by self-floatation until it is situated in vertical correspondence with its installation site (5). Said box (8) carries resting therein at least a portion of the tower (12), which in this case is a telescopic-type tower. In this embodiment, a wind turbine is transported already installed together with the foundation (2). As seen in the figure, the system for installing anti-scouring material (1) according to the present invention has been installed prior to transporting the assembly in a single operation.

Preferably, the anti-scouring material (1) is completely or partially submerged during the towing transportation process, which reduces the effective weight thereof and therefore the effect thereof on the depth of the assembly. The use of low-density materials such as tyres, the density thereof being very similar to that of water, provides a relevant advantage given that the effect thereof on the depth of the assembly is minimised or even practically nullified.

Figure 5:
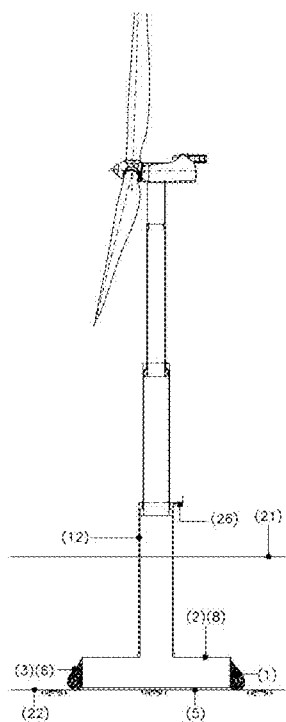

FIG. 5 shows said box (8) which has already been situated in said installation site (5), by means of gravity, in this case by weighing it down using the flooding of the inner space thereof with water from the sea (21) itself.

Figure 6:
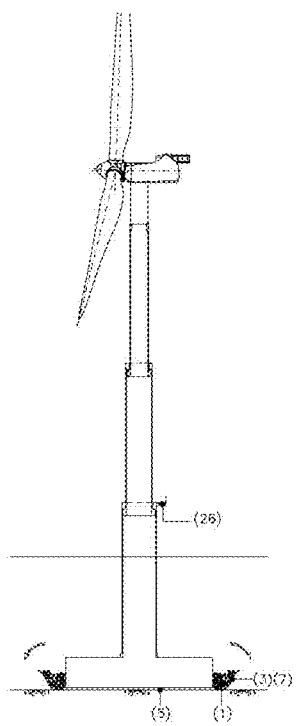

FIG. 6 shows that one of the ends of the cord (18) emerging from the surface of the sea (21) is pulled through the respective row of guiding arches (17), while the other end of the cords (18) emerging from the surface of the sea (21) is released through the respective row of guiding arches (17). Thus, said cord (18) is unthreaded from the grommets (15), the attachment arches (16) and the guiding arches (17), releasing the edge (20) from grommets of said mesh (14); meaning, said operating assembly (15), (16), (17), (18) is freed or deployed. FIG. 6 shows a moment of this phase wherein said cord (18) has been unthreaded from a portion of said grommets (15), from a portion of said attachment arches (16) and from a portion of said guiding arches (17) and has therefore already released a portion of the edge (20) from grommets of said mesh (14). Said portion of the edge (20) of grommets of said mesh (14) that has already been released then falls on the seabed (22) from the effects of the weight of the tyres (13), and said tyres (13) are thus deployed in the area of the seabed (22) contiguous to said box (8). Preferably, the securing device (4) can be actuated from a working platform (26) located in the tower (12) and which stays above the water throughout the entire process. To do so, the cord (18) can be operated from said platform (26).

Figure 7:
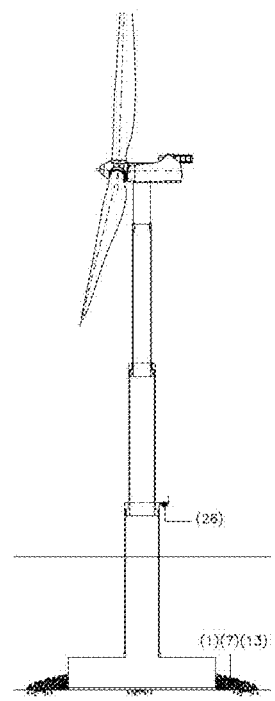

FIG. 7 shows that the cord (18) has already been completely withdrawn and all the tyres (13) are therefore already deployed in the vicinity of the seabed (22) surrounding said box (8) in a contiguous manner.

Preferably, the very mesh (14) that has acted as a housing device in the provisional installation phases, and that in the definitive situation is located completely or partially underneath the anti-scouring material (1), can also contribute to reducing or preventing the possible scouring.

Subsequently, due to the effects of natural movements of the seabed, the tyres (13) can tend to slowly fill up with material from the bed, sand for example, which gives them weight and improves the function thereof as anti-scouring material (1). Preferably, the tyres (13) are joined to each other by means of cords or any other attachment means known in the state of the art, which is advantageous in order to prevent units from being dragged or separated from the rest. The tyres can be separated or grouped into bags or secondary meshes, inside the main mesh (14).

Figure 8:
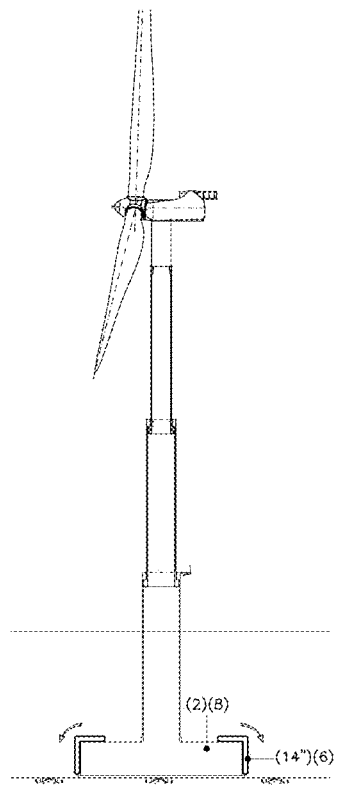
FIG. 8 schematically represents, in a cross section of a side elevation view, an embodiment of the system according to the present invention.
Figure 9:
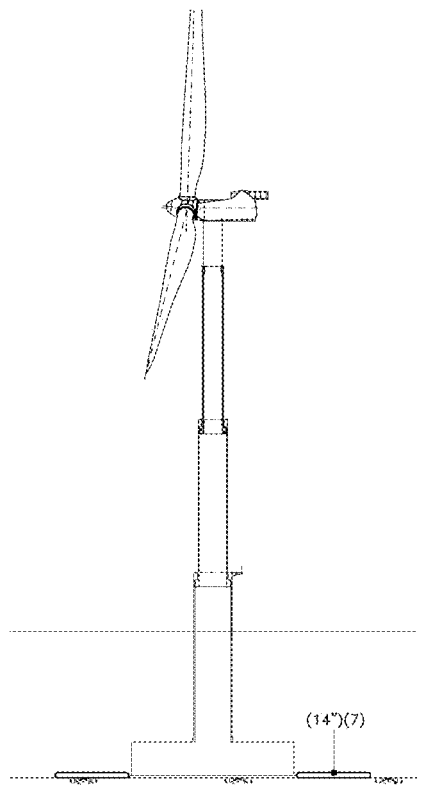
FIG. 9 schematically represents, in a cross section of a side elevation view, the system of FIG. 8 with the foundation installed and the installation system in the deployed configuration.

Referring to FIGS. 8 and 9, these figures show means for transporting and placing anti-scouring material for a premanufactured underwater foundation according to another preferred embodiment of the invention. Said means for transporting and placing anti-scouring material comprise a geotextile (14") which can be a simple layer (blanket-type) or a double layer (bag-type). Concrete slabs can also be used as an alternative to the geotextile. The securing device in this embodiment could be analogous to the one shown in other embodiments such as the ones described in FIGS. 1 to 3 or in FIG. 10A or 10B.

FIG. 8 shows the system in the folded position (6) thereof, and FIG. 9 shows the system in the deployed configuration (7) thereof.

In this embodiment, the anti-scouring material is the geotextile (14") itself and the housing device are elements to support and/or fasten the lower edge of said geotextile arranged laterally along the perimeter of the foundation, which can be articulated or not. Optionally, when using a bag-type double-layer geotextile, the inner space of the geotextile (14") can be filled with another material, preferably hardenable. Optionally, the geotextile can incorporate seeds, fertilisers or other components intended to facilitate the vegetation of the seabed (22) in the area contiguous to the box (8). In order to facilitate a better deployment of the geotextile on the seabed, the geotextile can have a tubing on the outer perimeter edge thereof, such as a hose or similar, able to be filled by pressure, such that it tends to adopt the essentially circular geometry thereof and in this manner contribute to the deployment of the geotextile.

Figure 10A:
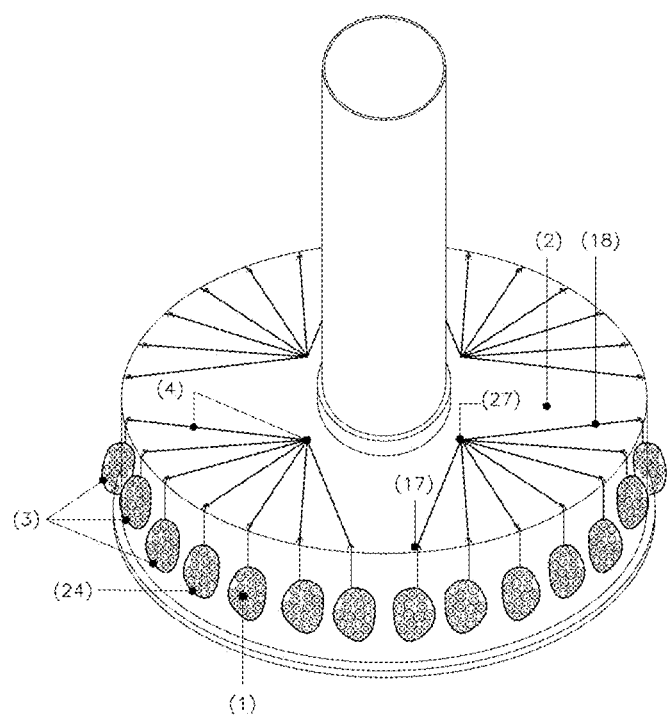
FIGS. 10A-10B show two preferred embodiments of the invention, wherein the device for housing the anti-scouring material comprises a plurality of bags for housing said material, arranged around the marine foundation.
Figure 10B:
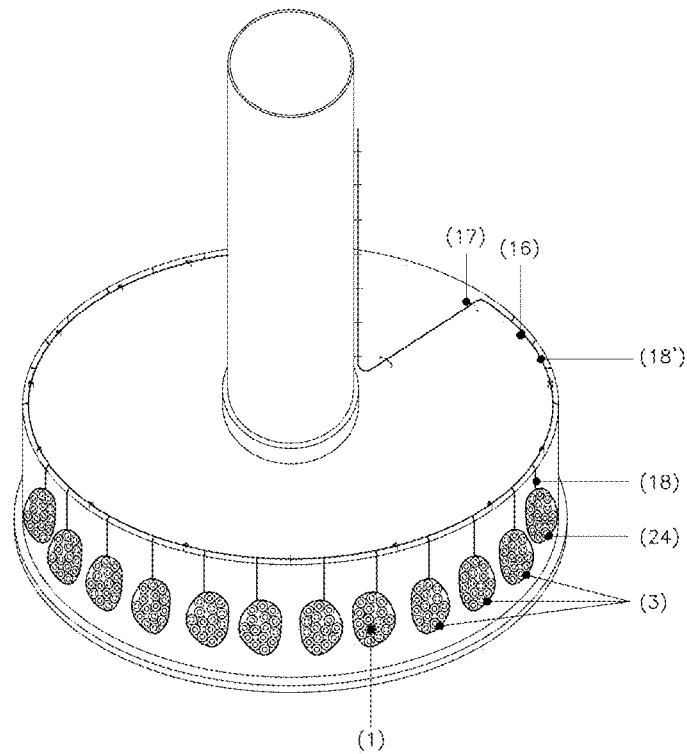

FIGS. 10A and 10B show other preferred embodiments of the invention, wherein the device (3) for housing the anti-scouring material (1) comprises a plurality of housing bags (24) suspended laterally around the marine foundation (2). In said embodiment, each one of these bags (24) is connected to a cord (18) or cable for retaining them, wherein said cord (18) acts as a device (4) for securing the anti-scouring material (1) and the housing device (3). As a person skilled in the art will see, the use of meshes (14), bags (24) or other equivalent solutions are indistinctly applicable in the scope of the invention, without altering the object thereof. It is likewise possible that a single cord (18) enables more than one bag (24) to be suspended.

In the embodiment of FIG. 10A, the securing device (4) has an operating assembly for the deployment of said bags (24) comprising one or more provisional securing elements (27) for the different cords (18) from which the bags (24) are suspended, said securing element being releasable, such that once the foundation rests on the seabed (22), the cords (18) can be released thus letting the bags (24) fall on the seabed (22). Said provisional securing element (27) can be remotely actuable (for example by means of cords or ties operated from the surface, not shown in the figure), or it can be designed to be self-releasing once the foundation (2) is resting on the seabed (22), and it can be positioned in any convenient point of the foundation (2) and/or the tower (12) and/or the working platform (26). This embodiment of the invention possesses some additional advantages, since it enables the anti-scouring material (1) to be deployed without needing to open the bags (24) by means of releasing the housing device (3). Thus, the bags (24) fall towards the seabed (22), but maintain the anti-scouring material (1) inside them, which provides greater control over the deployment thereof at the feet of the foundation (1) or at another point of the tower (12). This solution, furthermore, facilitates the tasks of withdrawing or substituting the anti-scouring material (1) and implies a lesser environmental impact than that of other alternatives. Additionally, the fact that the anti-scouring material (1) is maintained housed in the bags (24) makes it so said material (1) has a lesser risk of moving due to the effects of waves, tides or currents.

In order to facilitate the positioning and/or the operations of the system, the operating assembly of the securing device (4) can also have guiding arches (17), and/or guides, pulleys or analogous elements that facilitate the positioning, guiding or securing of the cords (18). As a person skilled in the art will see, said operating assembly can be divided into several operating subassemblies, each of which is applied on a fraction of all the bags (24) surrounding the foundation (2) for the purpose of limiting the size thereof and/or facilitating the placement and/or operations thereof.

FIG. 10B shows an alternative securing device (4), wherein each cord (18) for securing the different bags stays joined to a second cord (18'), which is threaded through attachment arches (16) and/or guiding arches (17), such that when the second cord (18') is released, it makes it so the different suspended bags (24) descend until resting in their final position on the seabed (22).

FIGS. 11A-11C show different steps of the method for installing the transportation and placement means described in FIGS. 10a-10b, analogous to those of FIGS. 4-7.

As a person skilled in the art will see, other configurations of the securing system with different operating assemblies can be used with analogous effects and based on elements known in the art, without leaving the scope of the invention for this reason.

Preferably, the different bags (24) are joined to each other, such that it prevents each bag from acting as a separate and independent element. This can be especially convenient during the towing transportation phase of the assembly made up of the foundation (2) and the system for installing the anti-scouring material (1).

Figure 12A:
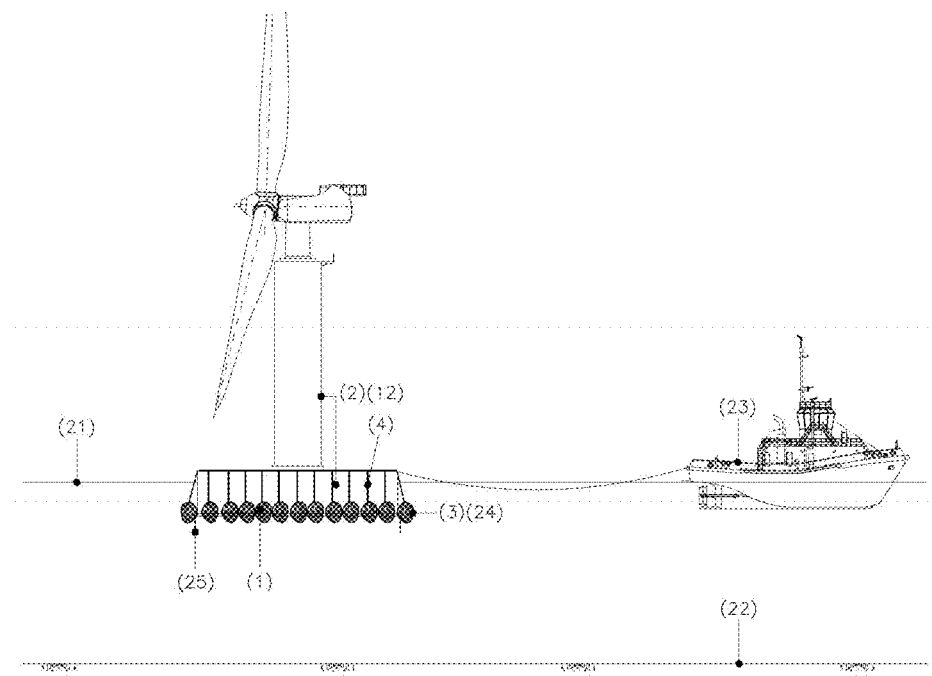
FIGS. 12A-12C show three steps of a preferred embodiment of the invention, wherein the marine foundation comprises perimeter skirts, adapted to penetrate the seabed when the foundation rests thereon.
Figure 12B:
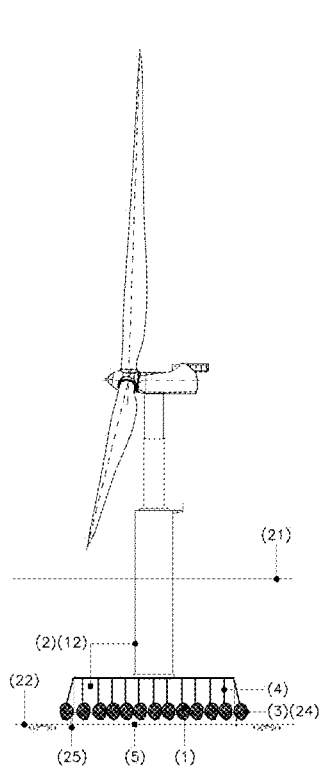
Figure 12C:
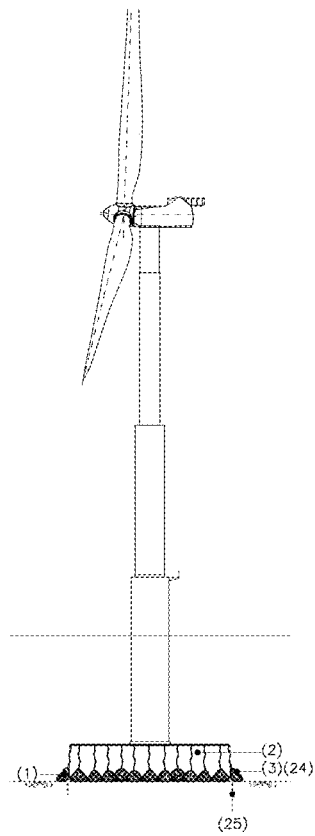

FIGS. 12A-12C show different phases of another preferred embodiment of the invention, wherein the marine foundation (2) comprises perimeter skirts (25) which penetrate the seabed (22) when the foundation (2) rests thereon, wherein the lower dimension of said skirts (25) is smaller than the dimension of the anti-scouring material (1), such that the nailing of the skirts is started before the anti-scouring material (1) comes into contact with the seabed (22). As described in previous sections, thanks to the skirts (25), when the anti-scouring material (1) makes contact with the seabed (22) it prevents the risk of said material being able to slide under the foundation (2), even if it has not yet rested on the bed (22), since the skirts (25) act as a barrier. Additionally, the skirts (25) make it possible for the anti-scouring material (1) to go directly in the definitive dimension thereof (coinciding with the base of the foundation (2)), making the means for controlling the configuration of the positions of the fastening device (4) unnecessary.

As a person skilled in the art will understand based on the teachings of the present document, a manual mechanical operating assembly, like the ones described here in relation to different embodiments of a respective assembly device according to the present invention, can be substituted by an electromechanical assembly device by remote control. However, in certain applications this second type of assembly device could end up being too costly, for example due to requiring a high number of parts with high resistance in sea environments.

Naturally, the start of the invention staying the same, the embodiments and the construction details can vary widely with respect to the ones described and illustrated herein, purely by way of non-limiting example, without thus leaving the scope of the invention for this reason as defined in the attached claims.

What is claimed is:

1. A system for installing anti-scouring material on a premanufactured marine foundation, said foundation being transportable in a self-floating manner to the foundation's final position on the seabed, the system comprising:
    at least one housing device for housing the anti-scouring material, wherein said housing device comprises multiple bags filled with anti-scouring material, laterally adjacent to the perimeter of the foundation and joined to each other;
    at least one device for securing the housing device to the marine foundation, comprising a plurality of independent cords or cables for retaining the multiple bags, wherein each of the multiple bags is connected to one of the independent cords or cables; and
    a remote control and/or actuation device for said securing device, wherein said control device is adapted to configure the housing device in, at least, two positions:
        a folded configuration position, wherein the bags of the housing device are maintained in a provisional and retracted position different from its final position in the installed condition, adjacent to the perimeter of the foundation; and
        a deployed configuration position, wherein the bags of the housing device are released, completely or partially, promoting the positioning of the bags of said housing device in its final position, contiguous to the marine foundation,
    wherein the securing device comprises at least one provisional securing element connected to the plurality of independent cords or cables from which the bags are suspended, said securing element being releasable, thereby allowing the plurality of bags to fall on the seabed with the housing device in the deployed configuration position, and
    wherein the anti-scouring material has a density that does not exceed more than 50% of the density of the water, wherein at least a portion of said material is located in a submerged position during the transportation of the marine foundation to its final position.

2. The system according to claim 1, wherein the anti-scouring material comprises one or more of the following materials: gravel, rocks, sandbags, rockfill, tyres, hardenable compositions, concrete, blocks slabs, or hollow bodies, vegetation, seeds.

3. The system according to claim 1, wherein the housing device comprises one or more of the following elements: a net, a mesh, a geotextile, a grate, a canopy, a cloth for housing.

4. The system according to claim 1, wherein the marine foundation is a gravity foundation comprising a hollow concrete base that can float provisionally.

5. The system according to claim 1, wherein the marine foundation comprises perimeter skirts which penetrate the seabed with the foundation resting thereon, wherein the lower depth level of said skirts is smaller than the lower depth level of the anti-scouring material, such that the penetration of the skirts in the seabed is started before the anti-scouring material comes into contact with the seabed.

6. The system according to claim 1, wherein the marine foundation is a foundation of a wind turbine tower.

7. A method for installing anti-scouring material in a premanufactured marine foundation
    the method comprising performing, at least, the following steps in any order using a system according to claim 1:
    a) arranging anti-scouring material housed and/or supported in at least one housing device comprising multiple bags fillable with said anti-scouring material, laterally adjacent to the perimeter of the foundation and joined to each other;
    b) using at least one securing device for installing and/or fastening the device for housing anti-scouring material in the marine foundation, before transferring said marine foundation to its final location on the seabed;
    c) transporting in a self-floating manner the marine foundation together with the system for installing anti-scouring material;
    d) performing the anchoring of the marine foundation to its final position on the seabed.

8. The method for installing anti-scouring material according to claim 7 further comprising:
    e) arranging the securing device in the deployed configuration position, completely or partially releasing the housing device, and promoting the positioning of the bags of said housing device in its final position contiguous to the marine foundation.

9. The method according to claim 8, wherein the system comprises operating the remote control and/or actuation device for the configuration of the positions of the securing device, and wherein said remote control and/or actuation device is operated from a point at or above the surface of the sea.

10. The method of claim 7, wherein the method is performed during the transportation of a marine foundation in a self-floating manner along the surface of the sea and/or during the anchoring of a marine foundation to its definitive installation site on the seabed.

11. A wind turbine tower, wind turbine and/or equipment installed on a marine foundation using the system for installing anti-scouring material according to claim 1.

* * * * *